United States Patent
Dooley et al.

(10) Patent No.: US 12,505,700 B2
(45) Date of Patent: Dec. 23, 2025

(54) AUTOMATED ACTIVITY DETECTION

(71) Applicant: Accenture Global Solutions Limited, Dublin (IE)

(72) Inventors: Robert P. Dooley, Dublin, CA (US); Dylan James Snow, Concord, CA (US); Michael Kuniavsky, San Francisco, CA (US); Ronak Kumar Bhatia, Sunnyvale, CA (US)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 286 days.

(21) Appl. No.: 18/231,675

(22) Filed: Aug. 8, 2023

(65) Prior Publication Data
US 2025/0054338 A1     Feb. 13, 2025

(51) Int. Cl.
*G06K 9/00* (2022.01)
*G06T 7/20* (2017.01)
*G06T 7/70* (2017.01)
*G06V 10/74* (2022.01)
*G06V 40/20* (2022.01)

(52) U.S. Cl.
CPC ............... *G06V 40/20* (2022.01); *G06T 7/20* (2013.01); *G06T 7/70* (2017.01); *G06V 10/761* (2022.01); *G06T 2207/30196* (2013.01)

(58) Field of Classification Search
None
See application file for complete search history.

(56) References Cited

U.S. PATENT DOCUMENTS

2020/0242345 A1* 7/2020 Huang .................. G06V 10/44
2021/0073524 A1* 3/2021 Boyer .................. G06V 10/62

OTHER PUBLICATIONS

[No Author], "Global Talent Trends 2020," Mercer LLC, 2020, 68 pages.
Acedo et al., "The resource-based theory: dissemination and main trends," Strategic Management Journal, Jul. 2006, 27(7):621-636.
Aguinis et al., "Benefits of Training and Development for Individuals and Teams, Organizations, and Society," Annual Review of Psychology, Jan. 10, 2009, 60:451-474.
(Continued)

*Primary Examiner* — Sj Park
(74) *Attorney, Agent, or Firm* — Mannava & Kang, P.C.

(57) ABSTRACT

Implementations are directed to receiving a set of time series image frames within a time period including a plurality of time points; identifying a first entity, wherein the first entity is coupled with a plurality of first positions corresponding to the plurality of time points; identifying a second entity, wherein the second entity is coupled with a plurality of second positions corresponding to the plurality of time points; determining a position difference of the first entity between any two consecutive time points; determining a position difference of the second entity between any two consecutive time points; determining an interaction between the first entity and the second entity based on i) the position difference of the first entity over the time period, and ii) the position difference of the second entity over the time period; determining whether metadata of the interaction satisfies a threshold; and providing feedback on the interaction.

20 Claims, 4 Drawing Sheets

(56) References Cited

OTHER PUBLICATIONS

AllenAI.org [online], "Grounded Situation Recognition," available on or before May 28, 2022 via Internet Archive: Wayback Machine URL<https://web.archive.org/web/20220528161742/https://prior.allenai.org/projects/gsr>, retrieved on Nov. 13, 2023, retrieved from URL<https://prior.allenai.org/projects/gsr>, 4 pages.
Barney et al., "On becoming a strategic partner: The role of human resources in gaining competitive advantage," Human Resource Management, 1998, 37(1):31-46.
Barney, "Firm Resources and Sustained Competitive Advantage," Journal of Management, Mar. 1991, 17(1):99-120.
Crook et al., "Does human capital matter? A meta-analysis of the relationship between human capital and firm performance," Journal of Applied Psychology, May 2011, 96(3):443-456.
Cropley, "Educational brokering: Access to lifelong education?," International Review of Education, Sep. 1977, 23:339-343.
GitHub.com [online], "allenai/swig," Jul. 13, 2020, retrieved on Nov. 13, 2021, retrieved from URL<https://github.com/allenai/swig>, 4 pages.
Ifenthaler et al., "Student perceptions of privacy principles for learning analytics," Educational Technology Research and Development, Aug. 17, 2016, 64:923-938.
Ifenthaler, "Effects of experimentally induced emotions on model-based reasoning," Learning and Individual Differences, Oct. 2015, 43:191-198.
Matthews, "Workplace Learning: Developing a Holistic Model," The Learning Organization, 1999, 6(1):18-29.
Pratt et al., "Grounded Situation Recognition," CoRR, submitted on Mar. 26, 2020, arXiv:2003.12058v1, 26 pages.
Wood, "The problems of problem-based learning," Biochemical Education, Apr. 1994, 22(2):78-82.

* cited by examiner

AUTOMATED ACTIVITY DETECTION

BACKGROUND

Human activity recognition is the process of interpreting human motion using computer and machine vision technology. Human motion can be interpreted as activities, gestures, or behaviors. For example, human activity recognition can identify and name activities of a person based on gathered raw data from various sources (e.g., devices). Examples of such devices can include wearable sensors, electronic device sensors, camera devices, closed-circuit television, and some commercial off-the shelf equipment.

SUMMARY

Implementations of the present disclosure are generally directed to an automated activity detection system that enables computer recognition of activities from image sequences. The automated activity detection system of the present disclosure can be used to evaluate how a user performs a task. As described in further detail herein, implementations of the present disclosure can break up the task into sub-tasks and evaluate the performance of each sub-task.

More particularly, the automated detection system can monitor the user performing a task based on time series image frames (e.g., frames of a video or video segments) captured by a camera. The automated detection system can perform user pose detection, object detection, determination of spatial and angle relations between the user and objects. Such that the automated detection system can determine the interaction of the user with one or more objects that corresponds to each sub-task. The automated detection system can determine whether the interaction (e.g., the activity performed by the user on the objects) matches a best practices task model. The system can provide feedback on the interactions indicating whether the user has successfully operated the equipment in the sub-task.

The system can train a machine learning (ML) model, such as a neural network model, using a set of image frames and a label for a task during specific image frames. The trained ML model can use a series of image frames as input to automatically classify tasks across the series of image frames. The ML model can include different individual models, such as models for identifying different motions or activities. The individual models can be replaced in different tasks without changing the basic architecture. This enables the system to be adaptable to various tasks. Furthermore, the individual models can perform activity detection in each sub-task and evaluate user's activity in a more accurate and robust manner. For example, the system can detect subtle signals, such as surprises or errors, that can be easily missed by a human. The individual models can act as specialized classifiers to detect specific activity details that cannot be recognized by a human.

The system can monitor the user's behavior in performing a task in a fine-grained scale, and provide more accurate guidance and feedback. As a result, the system can provide the personal training and coaching in a more effective way. The system can provide each user one-on-one attention as the user is performing a certain process and provide customized coaching. Furthermore, the system can provide personal training and coaching service at a larger scale and in a more efficient manner. The system can train new workers quickly and safely on complex and potentially dangerous equipment that require specific operating procedures in various industries (e.g., home healthcare, manufacturing, hospitality, construction, food service, etc.).

In some implementations, actions include receiving a set of time series image frames within a time period including a plurality of time points; identifying a first entity included in the set of time series image frames, wherein the first entity is coupled with a plurality of first positions corresponding to the plurality of time points; identifying a second entity included in the set of time series image frames, wherein the second entity is coupled with a plurality of second positions corresponding to the plurality of time points; determining a position difference of the first entity between any two consecutive time points in the time period; determining a position difference of the second entity between any two consecutive time points in the time period; determining an interaction between the first entity and the second entity over the time period based on i) the position difference of the first entity over the time period, and ii) the position difference of the second entity over the time period; determining whether metadata of the interaction satisfies a threshold; and providing feedback on the interaction indicating whether the metadata of the interaction satisfies the threshold. Other implementations of this aspect include corresponding systems, apparatus, and computer programs, configured to perform the actions of the methods, encoded on computer storage devices.

These and other implementations can each optionally include one or more of the following features. In some implementations, the metadata of the interaction includes one or more of a duration of the interaction, an angle of the interaction, a type of the interaction, a position change of the first entity over the time period caused by the interaction, and a position change of the second entity over the time period caused by the interaction.

In some implementations, determining the interaction between the first entity and the second entity based on the position difference of the first entity and the position difference of the second entity includes: determining a relative distance between the first entity and the second entity at each time point based on the plurality of first positions and the plurality of second positions; determining a difference of the relative distance between two consecutive time points; and determining the interaction using the difference of the relative distance over the time period.

In some implementations, the position difference includes relative position difference and absolute position difference. In some implementations, the first entity corresponds to a human, the second entity corresponds to an object operated by the human, and the interaction corresponds to a particular activity performed by the human on the object.

In some implementations, the actions further include determining a plurality of interactions between an entity corresponding to a human and other entities, the plurality of interactions correspond to a plurality of subtasks of the task, the interaction comprising a subtask of the plurality of subtasks.

In some implementations, determining whether metadata of the interaction satisfies a threshold includes: executing a machine learning model using the set of time series image frames as input of the machine learning model, wherein the machine learning model is previously trained using training data set corresponding to standard operations of the interaction.

It is appreciated that methods in accordance with the present disclosure can include any combination of the aspects and features described herein. That is, for example, apparatus and methods in accordance with the present disclosure are not limited to the combinations of aspects and features specifically described herein, but also may include any combination of the aspects and features provided.

The details of one or more implementations of the present disclosure are set forth in the accompanying drawings and the description below. Other features and advantages of the present disclosure will be apparent from the description, drawings, and claims.

BRIEF DESCRIPTION OF DRAWINGS

Like reference numbers and designations in the various drawings indicate like elements.

DETAILED DESCRIPTION

Figure 1:
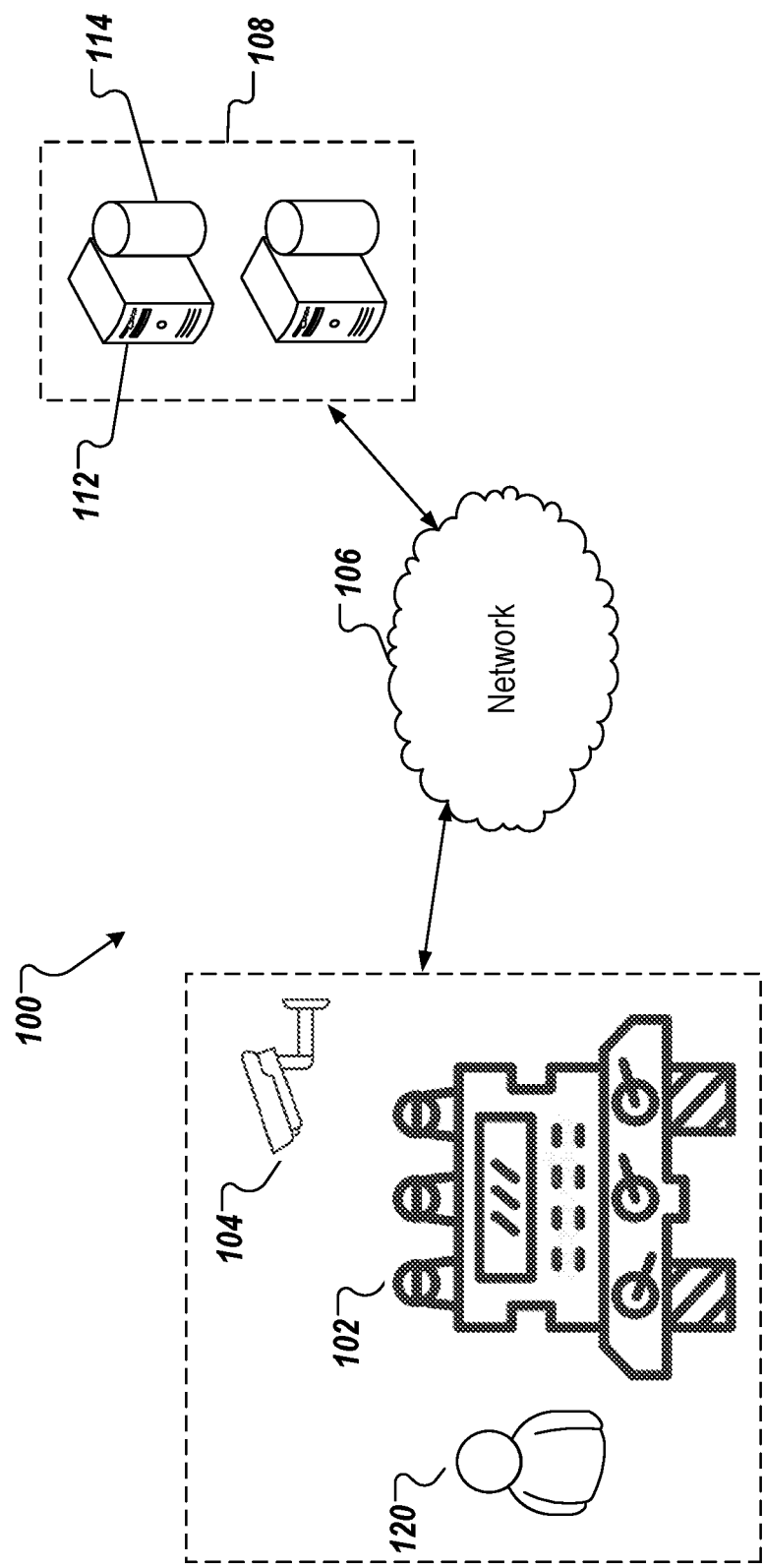
FIG. 1 depicts an example system that can execute implementations of the present disclosure.

Implementations of the present disclosure are generally directed to an automated activity detection system that enables computer recognition of activities from image sequences. The automated activity detection system of the present disclosure can be used for training applications, in which how a user performs a task is evaluated. As described in further detail herein, implementations of the present disclosure can break up the task into sub-tasks and evaluate the performance of each sub-task.

More particularly, the automated detection system can monitor the user performing a task based on time series image frames (e.g., a video) captured by a camera. The automated detection system can determine the interaction of the user with one or more objects that corresponds to each sub-task. The automated detection system can determine whether the interaction (e.g., the activity performed by the user on the objects) matches a best practices task model. The system can provide feedback on the interactions indicating whether the user has successfully operated the equipment in the sub-task.

The system can monitor the user's behavior in performing a task in a fine-grained scale, and provide more accurate guidance and feedback. As a result, the system can provide the personal training and coaching in a more effective way. The system can provide each user one-on-one attention as the user is performing a certain process and provide customized coaching. Furthermore, the system can provide personal training and coaching service at a larger scale and in a more efficient manner. The system can train new workers quickly and safely on complex and potentially dangerous equipment that require specific operating procedures in various industries (e.g., home healthcare, manufacturing, hospitality, construction, food service, etc.).

In some implementations, actions include receiving a set of time series image frames within a time period including a plurality of time points; identifying a first entity included in the set of time series image frames, wherein the first entity is coupled with a plurality of first positions corresponding to the plurality of time points; identifying a second entity included in the set of time series image frames, wherein the second entity is coupled with a plurality of second positions corresponding to the plurality of time points; determining a position difference of the first entity between any two consecutive time points in the time period; determining a position difference of the second entity between any two consecutive time points in the time period; determining an interaction between the first entity and the second entity over the time period based on i) the position difference of the first entity over the time period, and ii) the position difference of the second entity over the time period; determining whether metadata of the interaction satisfies a threshold; and providing feedback on the interaction indicating whether the metadata of the interaction satisfies the threshold.

FIG. 1 depicts an example system 100 that can execute implementations of the present disclosure. The example system 100 includes equipment 102, a camera 104, a back-end system 108, and a network 106. In some examples, the network 106 includes a local area network (LAN), wide area network (WAN), the Internet, or a combination thereof, and connects web sites, devices (e.g., the camera 104), and back-end systems (e.g., the back-end system 108). In some examples, the network 106 can be accessed over a wired and/or a wireless communication link.

In some examples, the equipment 102 can include any appropriate objects that are operated by a user 120 to perform a process. For examples, the equipment 102 can include a coffee machine, a cup, a water boiler, etc., when the user is performing the process of making a cup of coffee. The equipment 102 can be other objects in different operation processes, such as food processing devices, mechanical machines, healthcare devices, manufacturing machines, construction machines, etc.

The user 120 operating the equipment 102 may be a trainee receiving training to be able to quickly and safely operate the equipment. The training may require specific operating procedures. The back-end system 108 can monitor the user's operations and behaviors through the camera 104.

The camera 104 can be an instrument that captures visual images. The camera 104 can capture time series image frames (e.g., videos) of the user 120 interacting with the equipment 102. The camera 104 can send the time series image frames to the back-end system 108 over the network 106. In some implementations, the camera 104 can be multiple cameras installed in different locations of the working environment. The multiple cameras can capture the image frames of the user 120 interacting with the equipment 102 from different angles.

In the depicted example of FIG. 1, the back-end system 108 includes at least one server system 112, and data store 114 (e.g., database). In some examples, at least one server system 112 hosts one or more computer-implemented services (e.g., automated activity detection services) in accordance with implementations of the present disclosure. The back-end system 108 is also referred to as an automated activity detection system or system.

Figure 2:
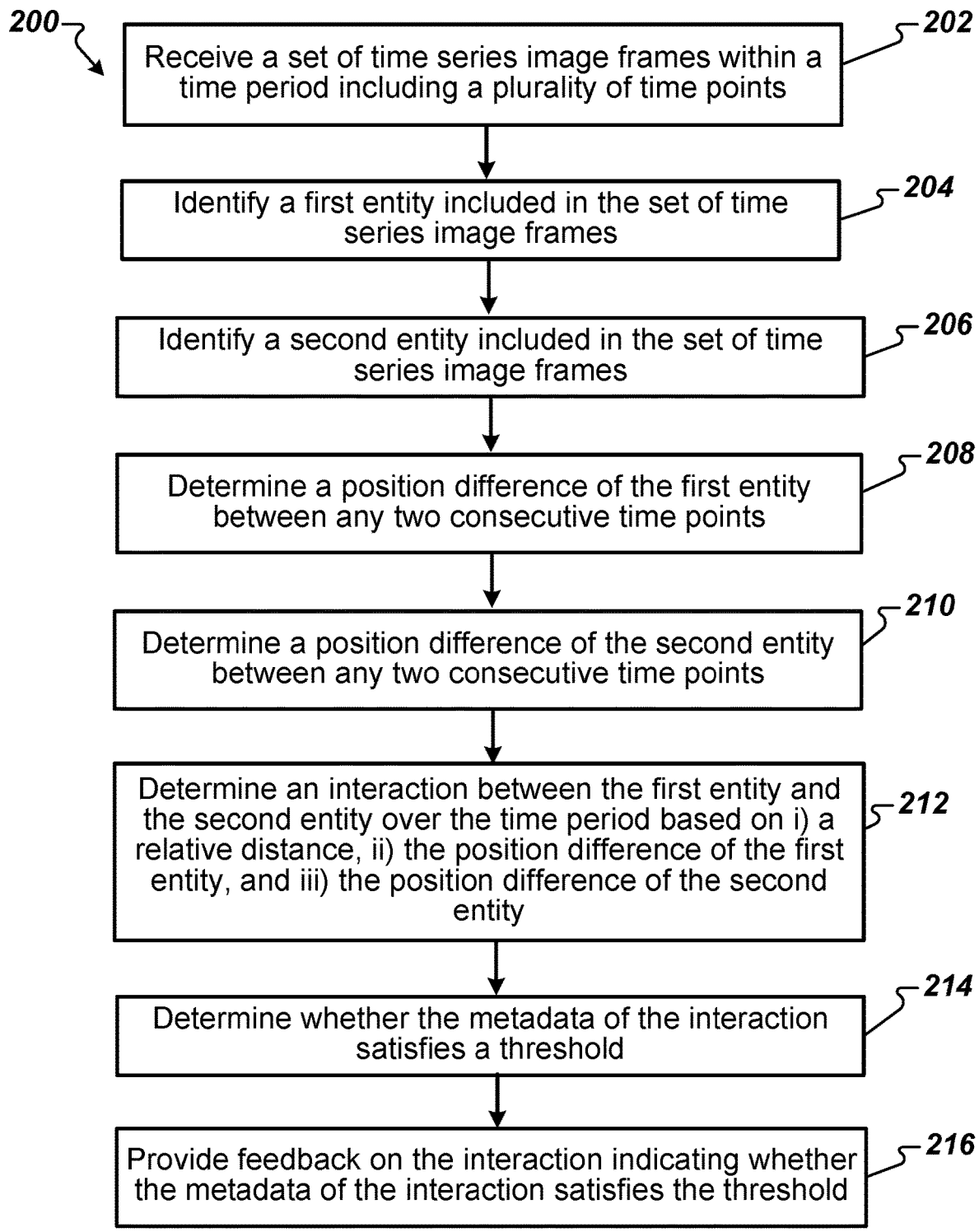
FIG. 2 depicts an example flow process of automated activity detection that can be executed in accordance with implementations of the present disclosure.
Figure 3:
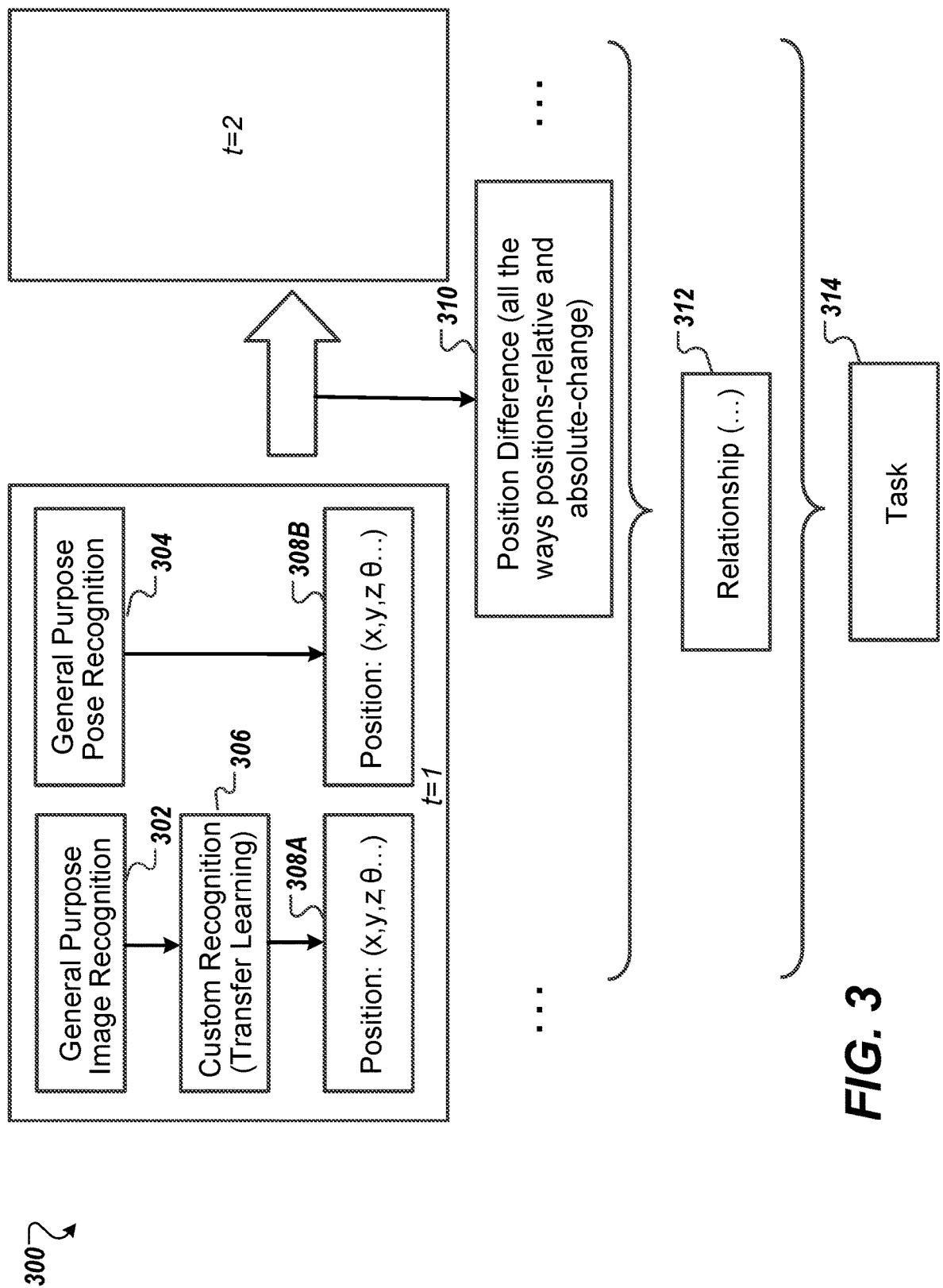
FIG. 3 depicts an example block process of automated activity detection for a subtask that can be executed in accordance with implementations of the present disclosure.
Figure 4:
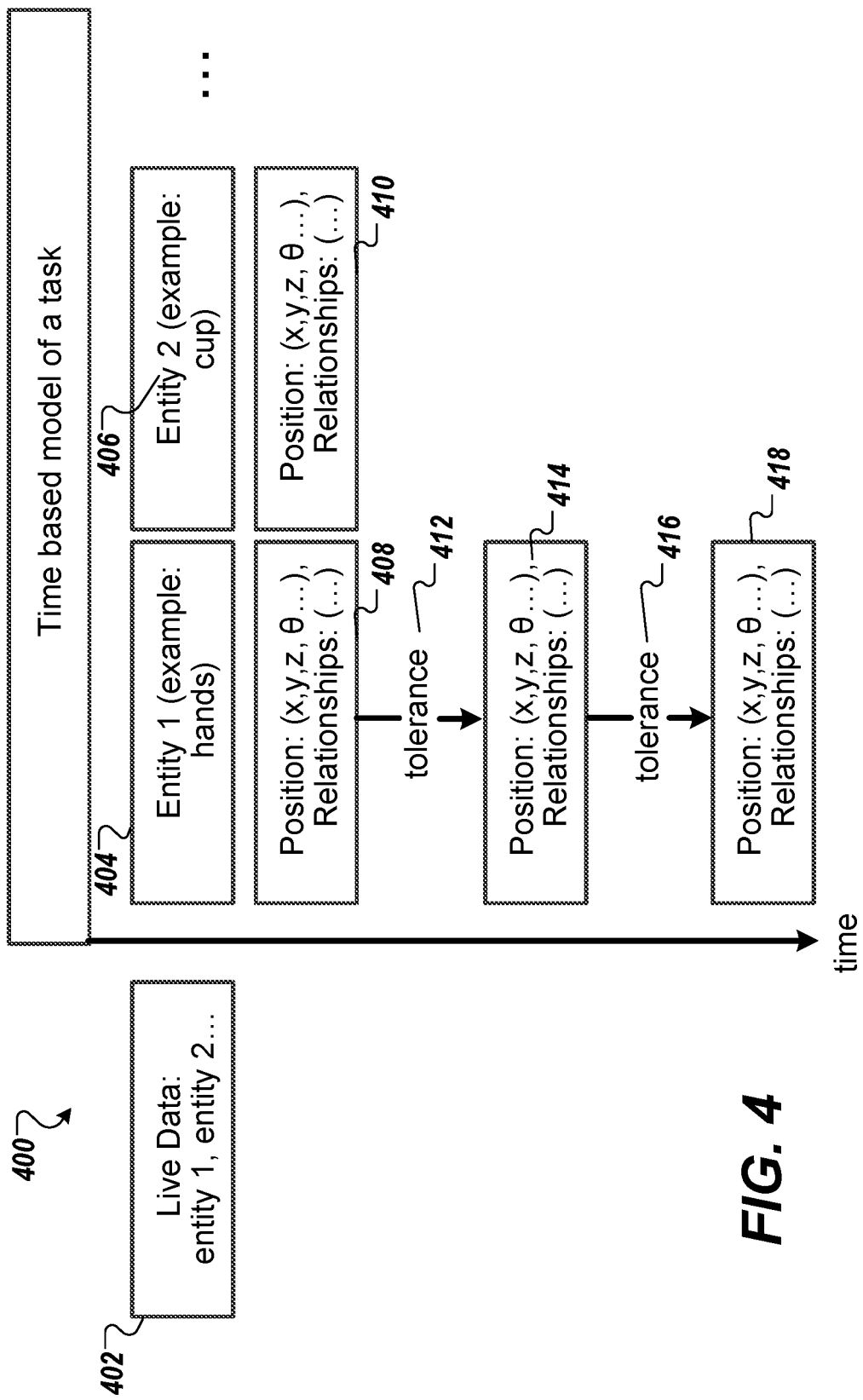
FIG. 4 depicts an example block process of automated activity detection for a task including multiple subtasks that can be executed in accordance with implementations of the present disclosure.

The back-end system 108 can determine the interactions of the user 120 with the equipment 102 based on the time series image frames (e.g., a video) captured by the camera 104. The back-end system 108 can execute a best practices model using the metadata of the interaction as input. The best practices task model can be a machine learning model that is previously trained. The machine learning model can be trained using a training data set corresponding to standard operations of the interaction. By executing the trained machine learning model, the back-end system 108 can obtain a result on whether the metadata of the interaction satisfies a threshold and determine whether the user 120 successfully performed a sub-task. FIGS. 2-4 and associated descriptions provide additional details of these implementations.

The system 100 can provide feedback on the interactions indicating whether the user has successfully operated the equipment 102. The back-end system 108 can provide the feedback as electronic messages over the network 106 to the user 120 using various output interfaces. For example, the system can send the feedback though a device (not shown) installed in the working environment, such as a speaker, or a screen. The feedback can be a voice message or a text message. In some examples, the system can send the feedback as voice messages through a speaker installed in a device (not shown) associated with the user 120, such as the user's mobile phone. In some examples, the system can send the feedback as text messages (e.g., short message service (SMS) messages, emails, and another form of application messages) to the user device.

In some examples, the server system 112 can store the time series image frames captured by the camera 104, the processing results of the image frames, the best practice model, and other relevant data in the data store 114. The server system 112 can also retrieve those data from the data store 114. The data store 114 can include any other information necessary for performing the functions described herein. For example, the data store 114 can store threshold values for determining whether the user successfully performed an activity in a sub-task.

The back-end system 108 can provide the feedback on the user's interaction with the equipment 102 to provide guidance or training for the user 120. In some implementations, the back-end system 108 can deliver second-by-second real time feedback. The back-end system 108 can offer encouragement when a subtask is completed correctly; and provide specific guidance for how to improve, when the subtask is not completed correctly.

The back-end system 108 can automatically monitor a user's execution of physical tasks as the user practices a process. The process can include multiple tasks. Each task can include multiple sub-tasks. The back-end system 108 can determine the user's interaction with the equipment corresponding to each sub-task. Because the system can determine the interaction corresponding to a subtask of a task, the system can monitor the user's behavior in performing a task in a fine-grained scale, and provide more accurate guidance and feedback. As a result, the system can provide the personal training and coaching in a more effective way.

The back-end system 108 can provide various forms of feedback appropriate to the specific user's competencies and gaps. The back-end system 108 can provide each user one-on-one attention as the user is performing a certain process and provide customized coaching. The back-end system 108 can serve as a personal trainer to provide guidance and training service for every user. Furthermore, the back-end system 108 can provide personal training and coaching service at a larger scale and in a more efficient manner.

The system can train new workers quickly and safely on complex and potentially dangerous equipment that require specific operating procedures. For example, the system can train new workers in various industries (e.g., home healthcare, manufacturing, hospitality, construction, food service, etc.).

FIG. 2 depicts an example flow process 200 of automated activity detection that can be executed in accordance with implementations of the present disclosure. The example process 200 can be implemented by the back-end system 108 shown in FIG. 1. In some examples, the example process 200 is provided using one or more computer-executable programs executed by one or more computing devices.

At step 202, the system can receive a set of time series image frames within a time period including a plurality of time points.

The system may receive the set of time series image frames from a camera that monitors a user conducting a certain process. For example, the user can be operating a work station, or interacting with a device or a platform. In some implementations, performing a process can include interacting with multiple objects or entities. In some implementations, performing a process can include performing multiple tasks. A process can include multiple tasks. For example, making a cup of coffee can include boiling cold water in a kettle; putting a filter in a cup; adding coffee grounds to the filter; pouring enough water over the grounds; and pouring a certain amount of milk into the cup of coffee. Further, the task of pouring milk into the cup of coffee can include grabbing the milk container, turning the milk container to pour it, and pouring the milk for a certain amount of time.

A camera can capture the set of consecutive image frames (e.g., a video) while the user is conducting a certain process. The set of time series image frames can be for a certain time period that includes a plurality of time points. In some examples, each image frame can be associated with a time stamp that corresponds to a time point. The system can receive the video (e.g., the set of time series image frames) from the camera over a network.

At step 204, the system can identify a first entity included in the set of time series image frames. The first entity can be coupled with a plurality of first positions corresponding to the plurality of time points.

In some implementations, the first entity can be associated with a human (e.g., the user). For example, the first entity can be the user's right hand. The system can identify the first entity and determine the positions of the first entity using image processing algorithms. For example, the system can use general purpose image recognition, and/or general purpose pose recognition algorithms. In some implementations, the system can perform custom recognition and/or transfer learning for specialty objects, such as statoscope, blood pressure sensor.

In some implementations, the system can input one or more image frames in the set of time series image frames into a machine learning (ML) model can identify entities depicted in images. In some examples, for each entity the ML model detects within an image, the ML model determines a class assigned to the entity by the ML model, the class identifying the entity as a particular type (e.g., human hand, cup).

The system can represent each position at each time point with (x, y, z) coordinates. The system can also include an orientation or angular position represented by θ.

At step 206, the system can identify a second entity included in the set of time series image frames. The second entity can be coupled with a plurality of second positions corresponding to the plurality of time points.

In some implementations, the second entity can be an object that is operated by the human (e.g., user), such as a cup. Similar to step 204, the system can identify the second entity and determine the positions of the second entity using image processing algorithms. For example, the system can use general purpose image recognition, and/or general purpose pose recognition algorithms. In some implementations, the system can perform custom recognition and/or transfer learning for specialty objects, such as statoscope, blood pressure sensor.

At step 208, the system can determine a position difference of the first entity between any two consecutive time points.

For instance, two consecutive time points can be t1 and t2. The system can use the position information at t1 and the position information at t2 to determine the position difference. The position difference can include relative position difference and absolute position difference. For example, the relative position difference can include the difference of relative distance between the first entity and the second entity. Based on the position of the first entity and the second entity at each time point, the system can determine the relative distance between the first entity and the second entity at each time point. The relative distance can be Euclidean distance. The system can use the relative distance to determine whether the user is interacting with the to-be-operated object, and how the user is interacting with the to-be-operated object. For example, based on the relative distance over the time period, the system can determine whether the first entity is in contact of the second entity at certain time points, whether the user is grabbing the to-be-operated object, or whether the user is putting down the to-be-operated object in a certain time period, etc. The system can use such information to determine the type of interaction (e.g., pressing, holding, moving, etc.).

In some examples, the relative position difference can include the difference of contact point of the first entity and the second entity. For example, while the user's hand is holding a certain object, the user's hand may move from one end of the object to another end, which can suggest a certain type of interaction (e.g., wiping, rubbing, etc.).

In some examples, the absolute position difference can include the difference of (x, y, z) coordinates. In some examples, the absolute position difference can include the difference of the angular position represented by θ. The difference of (x, y, z) coordinates can suggest the entity moves from one location to another location. The difference of the angular position can suggest the entity rotates or turns or tilts.

At step 210, the system can determine a position difference of the second entity between any two consecutive time points. As discussed above in step 208, the system can determine the position difference of the second entity between any two consecutive time points in a similar manner.

At step 212, the system can determine an interaction between the first entity and the second entity over the time period based on i) the relative distance between the first entity and the second entity at each time point, ii) the position difference of the first entity over the time period, and iii) the position difference of the second entity over the time period.

The interaction can correspond to a particular activity performed by the human on the to-be-operated object. For example, the interaction can indicate the type of interaction, such as pressing, grabbing, moving, etc.

Based on the position differences of both the first entity and the second entity over time, the system can determine the interaction between the two entities and the metadata of the interaction.

For example, the system can determine a relative distance between the first entity and the second entity at each time point based on the plurality of first positions and the plurality of second positions. The system can determine a difference of the relative distance between two consecutive time points, and determine the interaction using the difference of the relative distance over the time period. For instance, based on the difference of the relative distance, the system can determine whether one entity is getting closer or further to the other entity, or whether one entity is in contact with the other entity over a certain time period. The system can use such information to determine the type of interaction, such as whether the user is picking up an object or putting down an object. Further, the system can determine the duration of the interaction (e.g., how long the two entities are in contact). Based on the duration of the interaction, the system can determine the type of interaction (e.g., pressing, holding).

Furthermore, based on the position difference of the first entity and the second entity over the time period, the system can determine a position change of the first entity over the time period, a position change of the second entity over the time period. The system can further determine whether the two entities are moving together, which can suggest a certain type of interaction, such as carrying.

The system can determine the relative position difference (e.g., the difference of contact point of the first entity and the second entity) and further determine the type of interaction (e.g., wiping, rubbing, etc.). The system can also use the difference of the angular position of the first entity and the second entity to determine the type of interaction. For example, if both entities rotate in a certain degree, the system can determine that the type of interaction is pouring.

The metadata of the interaction can include one or more of a duration of the interaction, an angle of the interaction, a type of the interaction, a position change of the first entity over the time period caused by the interaction, and a position change of the second entity over the time period caused by the interaction.

In some implementations, the system can use fuzzy logic to determine the metadata of the interaction, such as the type of the interaction (e.g., pressing, grabbing, moving, etc.).

At step 214, the system can determine whether the metadata of the interaction satisfies a threshold. Based on the interaction between the first entity and the second entity, the system can determine whether the user is successfully operating the to-be-operated object. The system can determine whether the interaction (e.g., the activity performed by the user on the object) matches a best practices task model.

The best practices task model can be a machine learning model that is previously trained. The machine learning model can be trained using a training data set corresponding to standard operations of the interaction. For example, the training data set can include a set of image frames obtained by watching an expert performing the tasks and subtasks of a particular process multiple times. In some implementations, the training data can be input or adjusted by an expert to define the standard operations of the tasks and subtasks.

The system can execute the trained machine learning model using the set of time series image frames of the user interacting with one or more objects as input of the trained machine learning model to obtain a result on whether the metadata of the interaction satisfies a threshold. The trained machine learning model can determine the metadata of the interaction, and compare the monitored interaction metadata with the standard interaction metadata to obtain a distance. In some implementations, the trained machine learning model can output the distance between the monitored interaction data and the standard interaction data. The trained machine learning model can use the threshold as an additional input. The trained machine learning model can further determine whether the distance satisfies the threshold and output whether the user successfully completes the subtask corresponding to the interaction.

At step 216, the system can provide feedback on the interaction indicating whether the metadata of the interaction satisfies the threshold.

The result or feedback on whether the metadata of the interaction satisfying a threshold can indicate whether the user successfully operated a subtask corresponding to the interaction. For example, assume the metadata of the interaction indicates the user is pouring milk into a coffee cup, and the pouring activity lasted 3 seconds, with the milk container being angled at 45 degrees, the system can determine the amount of milk poured into the cup. The system can further determine whether the amount of milk is within a tolerance level of the best practices (e.g., is pouring too much, or too little, or acceptable?).

The system can provide the feedback on the user's interaction with the object to provide guidance or training for the user. In some implementations, the system can deliver second-by-second real time feedback. The system can offer encouragement when a subtask is completed correctly and provide specific guidance for how to improve, when the subtask is not completed correctly. For example, as the user pours milk into a coffee cup, the system can remind the user to pour more milk if the amount of poured milk is less than a threshold.

The system can provide the feedback as electronic messages to the user using various output interfaces. For example, the system can send the feedback though a device (not shown) installed in the working environment, such as a speaker, or a screen. The feedback can be a voice message or a text message. In some examples, the system can send the feedback as voice messages through a speaker installed in a device associated with the user, such as the user's mobile phone. In some examples, the system can send the feedback as text messages (e.g., short message service (SMS) messages, emails, and another form of application messages) to the user device.

The system can automatically monitor a user's execution of physical tasks as the user practices a process. The system can provide various forms of feedback appropriate to the specific user's competencies and gaps. The system can provide each user one-on-one attention as the user is performing a certain process and provide customized coaching. The system can serve as a personal trainer to provide guidance and training service for every user. Furthermore, the system can provide personal training and coaching service at a larger scale and in a more efficient manner.

The system can train new workers quickly and safely on complex and potentially dangerous equipment that require specific operating procedures. For example, the system can train new workers in various industries (e.g., home healthcare, manufacturing, hospitality, construction, food service, etc.).

Because the system can determine the interaction corresponding to a subtask of a process, the system can monitor the user's behavior in performing a task in a fine-grained scale, and provide more accurate guidance and feedback. As a result, the system can provide the personal training and coaching in a more effective way.

An interaction determined by the system can corresponds to a subtask of a task. For example, a task can be pouring milk into a cup of coffee that include three subtasks: grabbing the milk container, turning the milk container to pour it, and pouring the milk for a certain amount of time. The system can monitor the user's operation in the scale of subtasks by determining each interaction that corresponds to a subtask. The system can determine a plurality of interactions between an entity corresponding to a human and other entities. For example, the system can determine the interaction of the human with a coffee cup, a coffee machine, a water boiler, etc. The plurality of interactions between the user and any entity can correspond to a plurality of subtasks of the task. In some implementations, the system can monitor the user performing the plurality of subtasks in a time order. For example, after monitoring and providing feedback on one activity of one subtask, the system can monitor and provide feedback on the next activity of the next subtask. In some implementations, the user may be able to perform multiple subtasks in parallel. In such cases, the system can monitor and provide feedback on multiple interactions corresponding to the multiple subtasks in parallel. The multiple interactions may be for the user to interact with multiple objects.

The order of steps in the process 200 described above is illustrative only, and the process 200 can be performed in different orders. In some implementations, the process 200 can include additional steps, fewer steps, or some of the steps can be divided into multiple steps.

FIG. 3 depicts an example block process of automated activity detection for a subtask that can be executed in accordance with implementations of the present disclosure. The example process 300 can be implemented by the back-end system 108 shown in FIG. 1. In some examples, the example process 300 is provided using one or more computer-executable programs executed by one or more computing devices.

The system can receive a set of time series image frames corresponding to a plurality of time points. The system can identify one or more entities included in the set of time series image frames. For example, the system can identity a first entity (e.g., a human's hand) and a second entity (e.g., a to-be-operated object, such as a cup). The system can identify the entities using image processing algorithms, such as general purpose image recognition 302, general purpose pose recognition 304, custom recognition 306 (e.g., transfer learning). The system can further determine the positions 308A, 308B (collectively referred to as 308) of each entity at each time point based on the image processing algorithms. The position 308 can include (x, y, z) coordinates. The position 308 can also include an orientation or angular position represented by $\Theta$.

The system can determine a position difference between two consecutive time points for each entity. For instance, two consecutive time points can be t1 and t2. The system can use the position information at t1 and the position information at t2 to determine the position difference 310. The position difference 310 can include relative position difference and absolute position difference. For example, the relative position difference can include i) the difference of relative distance between the first entity and the second entity, ii) the absolute position difference of the first entity, and iii) the absolute position difference of the second entity. In some examples, the absolute position difference can include the difference of (x, y, z) coordinates. In some examples, the absolute position difference can include the difference of the angular position represented by $\theta$ The system can determine an interacting relationship 312 between the first entity and the second entity. The interacting relationship (also referred to as interaction) can correspond to a particular activity performed by the human on the to-be-operated object. For example, the interaction can indicate the type of interaction, such as pressing, grabbing, moving, etc.

The system can determine whether a task 314 is completed based on the interacting relationship 312. The task 314 can be in a fine-grained scale, such as a subtask of a task.

FIG. 4 depicts an example block process of automated activity detection for a task including multiple subtasks that can be executed in accordance with implementations of the present disclosure. The example process 400 can be implemented by the back-end system 108 shown in FIG. 1. In some examples, the example process 400 is provided using one or more computer-executable programs executed by one or more computing devices.

The system can receive live data 402 including a set of time series image frames (e.g., a video). The system can identity a first entity 404 (e.g., a human's hand) and a second entity 406 (e.g., a to-be-operated object, such as a cup). The system can determine the positions of the first entity and the second entity, and determine the position difference for each entity over a certain time period. Based on the position difference, the system can determine one or more interacting relationships 408, 410 between the first entity and the second entity. The interacting relationship (also referred to as interaction) can correspond to an activity performed by the human to the to-be-operated object in a subtask. The system can determine whether the subtask is successfully performed based on the metadata of the interaction. For example, the system can determine whether the metadata of the interaction is within a tolerance level 412. The tolerance level 412 can be a threshold. Based on whether the metadata of the interaction satisfying a threshold, the system can determine whether the user successfully operated a subtask corresponding to the interaction.

The system can monitor the user performing a plurality of subtasks in a time order. For example, after monitoring and determining one activity of one subtask, the system can continue monitoring and determining the next activity of the next subtask. The system can continue determining the positions, the position differences of the entities, and the interacting relationship 414 between the entities. The interacting relationship 414 can be correspond to an activity in a next subtask. The system can determine whether the metadata of the interacting relationship 414 is within another tolerance level 416 of the next subtask. The system can keep performing this process for the subsequent subtasks. For example, the system can further determine the positions, the position differences of the entities, and the interacting relationship 418 between the entities that corresponds to a following subtask.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products (i.e., one or more modules of computer program instructions encoded on a computer readable medium for execution by, or to control the operation of, data processing apparatus). The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code that constitutes processor firmware, a protocol stack, a database management system, an operating system, or any appropriate combination of one or more thereof). A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display) monitor) for displaying information to the user and a keyboard and a pointing device (e.g., a mouse, a trackball, a touch-pad), by which the user may provide input to the computer. Other kinds of devices may be used to provide for interaction with a user as well; for example, feedback provided to the user may be any appropriate form of sensory feedback (e.g., visual feedback, auditory feedback, tactile feedback); and input from the user may be received in any appropriate form, including acoustic, speech, or tactile input.

Implementations may be realized in a computing system that includes a back end component (e.g., as a data server), a middleware component (e.g., an application server), and/or a front end component (e.g., a client computer having a graphical user interface or a Web browser, through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN") (e.g., the Internet).

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method comprising:
   receiving a set of time series image frames within a time period including a plurality of time points;
   identifying a first entity included in the set of time series image frames, wherein the first entity is coupled with a plurality of first positions corresponding to the plurality of time points;
   identifying a second entity included in the set of time series image frames, wherein the second entity is coupled with a plurality of second positions corresponding to the plurality of time points;
   determining a position difference of the first entity between any two consecutive time points in the time period;
   determining a position difference of the second entity between any two consecutive time points in the time period;
   determining an interaction between the first entity and the second entity over the time period based on i) the position difference of the first entity over the time period, and ii) the position difference of the second entity over the time period, comprises:
      determining a relative distance between the first entity and the second entity at each time point based on the plurality of first positions and the plurality of second positions;
      determining a difference of the relative distance between two consecutive time points; and
      determining the interaction using the difference of the relative distance over the time period;
   determining whether metadata of the interaction satisfies a threshold; and
   providing feedback on the interaction indicating whether the metadata of the interaction satisfies the threshold.

2. The computer-implemented method of claim 1, wherein the metadata of the interaction comprises one or more of a duration of the interaction, an angle of the interaction, a type of the interaction, a position change of the first entity over the time period caused by the interaction, and a position change of the second entity over the time period caused by the interaction.

3. The computer-implemented method of claim 1, wherein the position difference comprises relative position difference and absolute position difference.

4. The computer-implemented method of claim 1, wherein the first entity corresponds to a human, the second entity corresponds to an object operated by the human, and wherein the interaction corresponds to a particular activity performed by the human on the object.

5. The computer-implemented method of claim 1, further comprising:
   determining a plurality of interactions between an entity corresponding to a human and other entities, the plurality of interactions correspond to a plurality of subtasks of a task, the interaction comprising a subtask of the plurality of subtasks.

6. The computer-implemented method of claim 1, wherein determining whether metadata of the interaction satisfies a threshold comprises:
   executing a machine learning model using the set of time series image frames as input of the machine learning model, wherein the machine learning model is previously trained using training data set corresponding to standard operations of the interaction.

7. The computer-implemented method of claim 1, wherein each image frame of the set of time series image frames is associated with a time stamp that corresponds to a time point of the plurality of time points.

8. One or more non-transitory computer-readable storage media coupled to one or more processors and having instructions stored thereon which, when executed by the one or more processors, cause the one or more processors to perform operations comprising:

receiving a set of time series image frames within a time period including a plurality of time points;

identifying a first entity included in the set of time series image frames, wherein the first entity is coupled with a plurality of first positions corresponding to the plurality of time points;

identifying a second entity included in the set of time series image frames, wherein the second entity is coupled with a plurality of second positions corresponding to the plurality of time points;

determining a position difference of the first entity between any two consecutive time points in the time period;

determining a position difference of the second entity between any two consecutive time points in the time period;

determining an interaction between the first entity and the second entity over the time period based on i) the position difference of the first entity over the time period, and ii) the position difference of the second entity over the time period, comprises:

determining a relative distance between the first entity and the second entity at each time point based on the plurality of first positions and the plurality of second positions;

determining a difference of the relative distance between two consecutive time points; and determining the interaction using the difference of the relative distance over the time period;

determining whether metadata of the interaction satisfies a threshold; and providing feedback on the interaction indicating whether the metadata of the interaction satisfies the threshold.

9. The one or more non-transitory computer-readable storage media of claim 8, wherein the metadata of the interaction comprises one or more of a duration of the interaction, an angle of the interaction, a type of the interaction, a position change of the first entity over the time period caused by the interaction, and a position change of the second entity over the time period caused by the interaction.

10. The one or more non-transitory computer-readable storage media of claim 8, wherein the position difference comprises relative position difference and absolute position difference.

11. The one or more non-transitory computer-readable storage media of claim 8, wherein the first entity corresponds to a human, the second entity corresponds to an object operated by the human, and wherein the interaction corresponds to a particular activity performed by the human on the object.

12. The one or more non-transitory computer-readable storage media of claim 8, wherein the operations further comprise:

determining a plurality of interactions between an entity corresponding to a human and other entities, the plurality of interactions correspond to a plurality of subtasks of a task, the interaction comprising a subtask of the plurality of subtasks.

13. The one or more non-transitory computer-readable storage media of claim 8, wherein determining whether metadata of the interaction satisfies a threshold comprises:

executing a machine learning model using the set of time series image frames as input of the machine learning model, wherein the machine learning model is previously trained using training data set corresponding to standard operations of the interaction.

14. The one or more non-transitory computer-readable storage media of claim 8, wherein each image frame of the set of time series image frames is associated with a time stamp that corresponds to a time point of the plurality of time points.

15. A system, comprising:

one or more processors; and a computer-readable storage device coupled to the one or more processors and having instructions stored thereon which, when executed by the one or more processors, cause the one or more processors to perform operations comprising:

receiving a set of time series image frames within a time period including a plurality of time points;

identifying a first entity included in the set of time series image frames, wherein the first entity is coupled with a plurality of first positions corresponding to the plurality of time points;

identifying a second entity included in the set of time series image frames, wherein the second entity is coupled with a plurality of second positions corresponding to the plurality of time points;

determining a position difference of the first entity between any two consecutive time points in the time period;

determining a position difference of the second entity between any two consecutive time points in the time period;

determining an interaction between the first entity and the second entity over the time period based on i) the position difference of the first entity over the time period, and ii) the position difference of the second entity over the time period, comprises:

determining a relative distance between the first entity and the second entity at each time point based on the plurality of first positions and the plurality of second positions;

determining a difference of the relative distance between two consecutive time points; and determining the interaction using the difference of the relative distance over the time period;

determining whether metadata of the interaction satisfies a threshold; and providing feedback on the interaction indicating whether the metadata of the interaction satisfies the threshold.

16. The system of claim 15, wherein the metadata of the interaction comprises one or more of a duration of the interaction, an angle of the interaction, a type of the interaction, a position change of the first entity over the time period caused by the interaction, and a position change of the second entity over the time period caused by the interaction.

17. The system of claim 15, wherein the position difference comprises relative position difference and absolute position difference.

18. The system of claim 15, wherein the first entity corresponds to a human, the second entity corresponds to an object operated by the human, and wherein the interaction corresponds to a particular activity performed by the human on the object.

19. The system of claim 15, wherein the operations further comprise:

determining a plurality of interactions between an entity corresponding to a human and other entities, the plurality of interactions correspond to a plurality of subtasks of a task, the interaction comprising a subtask of the plurality of subtasks.

20. The system of claim 15, wherein each image frame of the set of time series image frames is associated with a time stamp that corresponds to a time point of the plurality of time points.

\* \* \* \* \*